(12) United States Patent
Fuller

(10) Patent No.: US 7,000,291 B2
(45) Date of Patent: Feb. 21, 2006

(54) MONEY CLIP

(76) Inventor: Edward A. Fuller, 3100 Erie Dr., Orchard Lake, MI (US) 48324

( * ) Notice: Subject to any disclaimer, the term of this patent is extended or adjusted under 35 U.S.C. 154(b) by 63 days.

(21) Appl. No.: 10/680,748

(22) Filed: Oct. 7, 2003

(65) Prior Publication Data
US 2005/0071956 A1  Apr. 7, 2005

(51) Int. Cl.
B65D 63/00 (2006.01)
A44B 21/00 (2006.01)

(52) U.S. Cl. .................. 24/17 B; 24/301; 359/318

(58) Field of Classification Search ............. 24/16 R, 24/16 PB, 17 A, 17 B, 17 AP; 359/507, 359/508, 511, 802, 803, 804, 808, 811, 813, 359/815, 817, 818
See application file for complete search history.

(56) References Cited

U.S. PATENT DOCUMENTS

| | | | | |
|---|---|---|---|---|
| 889,352 | A | * | 6/1908 | Bold .......................... 359/808 |
| 1,547,142 | A | * | 7/1925 | Bausch ....................... 359/808 |
| 2,100,239 | A | * | 11/1937 | Carlton ....................... 359/815 |
| D161,173 | S | * | 12/1950 | Gubics ....................... D16/135 |
| D165,043 | S | * | 11/1951 | Ankney ..................... D16/135 |
| 2,682,805 | A | * | 7/1954 | Tomasovic ................. 359/509 |
| D199,589 | S | * | 11/1964 | Hoogesteger .............. D16/135 |
| 5,101,300 | A | * | 3/1992 | Hicks ......................... 359/802 |
| 5,218,482 | A | * | 6/1993 | Cioffi ......................... 359/802 |
| 5,883,860 | A | * | 3/1999 | McKay ........................ 368/10 |
| D416,927 | S | * | 11/1999 | Jim ............................ D16/135 |
| 6,038,086 | A | * | 3/2000 | Brown ....................... 359/802 |
| 6,614,604 | B1 | * | 9/2003 | Budde ........................ 359/817 |
| D492,336 | S | * | 6/2004 | Yip et al. ................... D16/135 |
| 2004/0032652 | A1 | * | 2/2004 | Holmes et al. ............. 359/408 |

* cited by examiner

Primary Examiner—JJ Swann
Assistant Examiner—Ruth C. Rodriguez
(74) Attorney, Agent, or Firm—Harness, Dickey & Pierce, P.L.C.

(57) ABSTRACT

A money clip comprising a generally flat housing having an internal cavity and an elastic band secured to the housing for encircling and holding a wad a paper money between the band and housing. A magnifying glass is normally concealed within the cavity and is pivotally connected to the housing. The magnifying glass may be manually swung outwardly and inwardly of the cavity, to a location adjacent the housing, through an opening formed in the housing. The magnifying glass may be swung outwardly of the housing temporarily and by manually holding the clip with magnifying glass positioned over an object the print on the object may be read by the user, without disturbing the wad of paper money held by the money clip. Thereafter, the magnifying glass may be swung back into the housing cavity.

6 Claims, 3 Drawing Sheets

MONEY CLIP

BACKGROUND OF THE INVENTION

This invention relates to a money clip which includes a concealed magnifying glass that may be manually pivoted outwardly of the money clip for temporary use while the money clip continues to hold a folded wad of paper money.

Conventional money clips generally comprise either a pair of resilient arms between which a wad of paper money may be resiliently held or a base upon which a springy leg is connected for clamping a wad of paper money between the base and the leg. Another form of a money clip comprises a simple resilient or elastic band which is used to resiliently hold a batch of paper money that may be folded.

The money clip, with the paper money bills or notes, may conventionally be used in restaurants or in other locations where the user must read an invoice or bill that is printed in relatively small type. Moreover, the environment of a typical restaurant may involve insufficient lighting to enable the user to clearly read the invoice or bill. Hence, it is desirable to have on hand a magnifying glass so that the user of the money clip may easily read the small print and, simultaneously, have available the cash to promptly pay the bill.

Normally, it is inconvenient to carry a separate magnifying glass. Moreover, overtly taking out and using a separate magnifying glass generally would tend to direct attention to the person paying the bill in a manner which is undesirable. Hence, it is desirable to provide a handy magnifying glass coupled with the immediate availability of the cash needed to pay a bill under circumstances where the bill is difficult to read whether because of insufficient light or insufficient type size.

Hence, this invention is concerned with providing a money clip which normally holds a folded wad or batch of paper money notes or bills and simultaneously holds a concealed magnifying glass that can be easily positioned for use and then immediately concealed again within the money clip. Thus, use of the otherwise concealed magnifying glass would draw little attention to the user and can conveniently provide the magnification when needed by the user.

SUMMARY OF THE INVENTION

This invention contemplates providing a money clip which is formed of a generally flat housing having a space within which a magnifying glass may be concealed. An elastic band connected to the housing is used to resiliently hold cash, in the form of paper bills or notes, on the clip. Thus, the clip has both the cash in a convenient form for immediate disbursement and, simultaneously, provides a magnifying glass for immediate and temporary use in reading a bill or invoice which otherwise is difficult to read because of poor eyesight of the user or the small size of the print or insufficient lighting in the location where the bill is presented to the user of the money clip.

An object of this invention is to provide a simplified, flat money clip having an elastic-type band for holding a wad of paper money bills, and having a cavity within which a small magnifying glass may be concealed. The magnifying glass is pivotally connected to the housing which enables the user to swing the magnifying glass out of, and into a use position adjacent the clip, for magnification of the object to be scrutinized by the user and, then conveniently and swiftly swung back into the housing for concealment and storage.

A further object of this invention is to provide an inexpensive, simplified construction, money clip within which a magnifying glass is normally concealed for immediate use by swinging the magnifying glass outwardly and then back inwardly of the housing, while avoiding disturbing the money held by the clip during the time of use of the magnifying glass.

Yet a further object of this invention is to form a convenient way for carrying a wad of paper money and simultaneously a small magnifying glass adjacent the money so that the magnifying glass may be conveniently exposed for temporary use and then returned into a concealed storage adjacent the money when not in use.

These and other objects and advantages of this invention will become apparent upon reading the following description of which the attached drawings form a part.

DESCRIPTION

Figure 1:
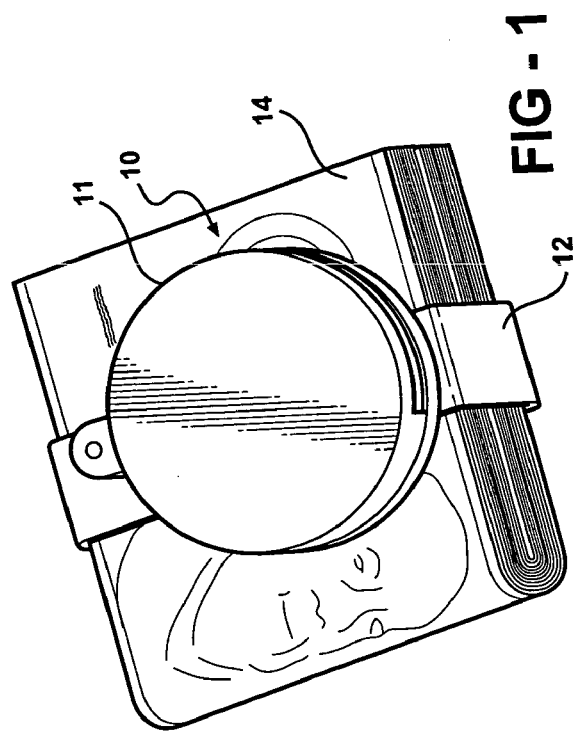
FIG. 1 is a perspective view showing the money clip holding a folded wad of paper money.

Referring to the drawings, the preferred embodiment comprises a money clip generally designated as 10, formed of a housing or envelope 11 and an elastic or resilient band 12. As illustrated in FIG. 1, a folded bundle or wad of paper money 14 is held on the clip, between the elastic band and the housing.

Figure 2:
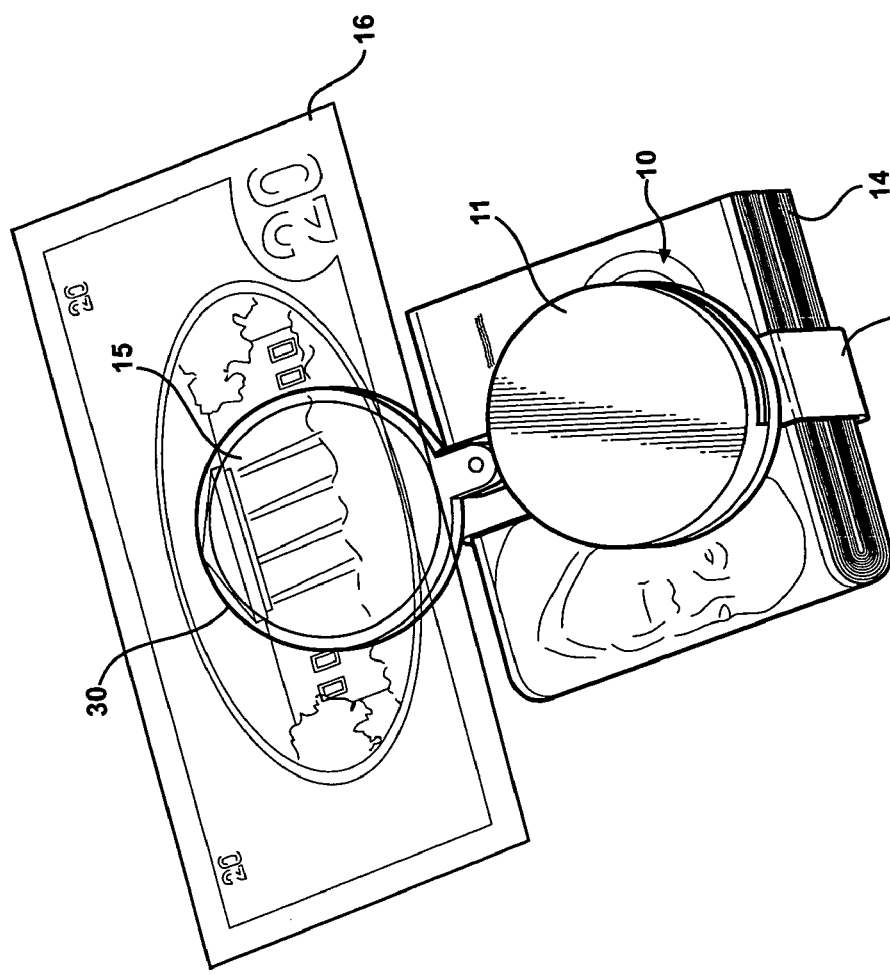
FIG. 2 illustrates, in perspective, the magnifying glass temporarily exposed for reading a single paper money bill. Similarly, the bill being scrutinized can, for example, be a restaurant bill, which gives a printed amount and a summary of the food purchased, or any other similar type of paper that should be read by the user.

A magnifying glass 15 is pivotally connected to the housing and can be extended laterally outwardly of the housing for reading, for example, a single sheet of paper money 16, as illustrated in FIG. 2, or an invoice or bill or any other paper presented to the user of the money clip.

Figure 7:
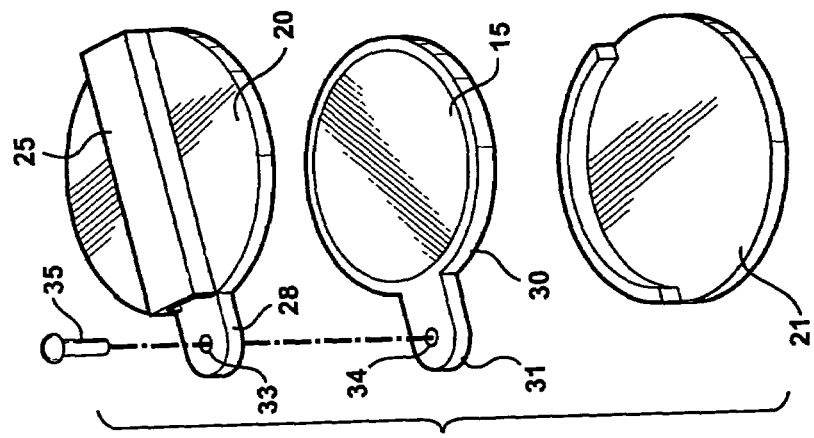
FIG. 7 is a disassembled view, in perspective, showing the three major parts which form the money clip, but with the lower plate on top, the magnifying glass in the center and the upper plate shown upside down beneath the magnifying glass.
Figure 5:
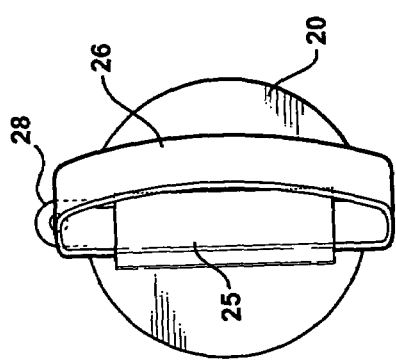
FIG. 5 is a partially perspective view of the rear or lower face of the money clip housing and band.
Figure 4:
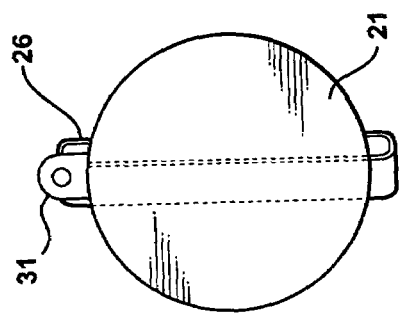
FIG. 4 is a plan view of the upper face of the money clip.
Figure 6:
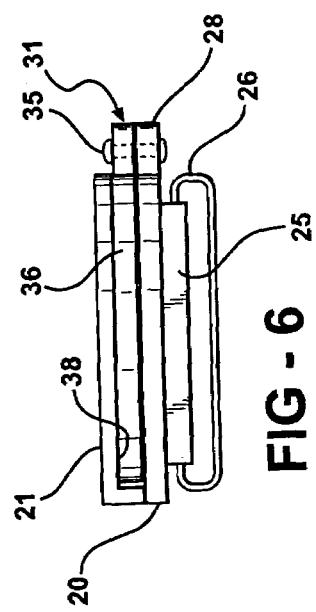
FIG. 6 is an enlarged side view of the money clip with the magnifying glass stored within the cavity or space between the upper and lower plates that form the housing.
Figure 3:
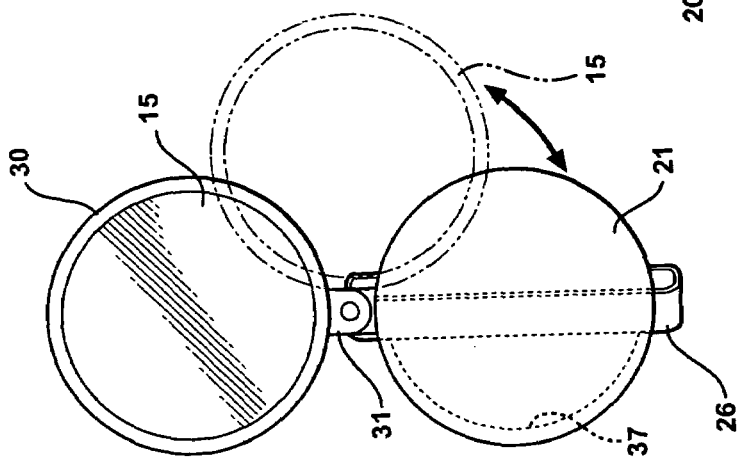
FIG. 3 is a top plan view of the money clip with the magnifying glass shown in its pivoted position adjacent the housing and illustrating in dotted lines the magnifying glass being swung back into the housing for storage.
Figure 8:
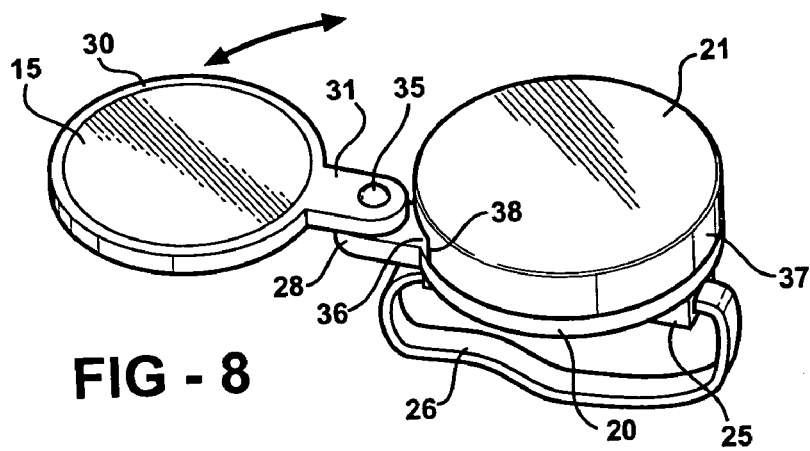
FIG. 8 is a perspective view of the money clip with the magnifying glass pivoted outwardly of the opening in the housing.

The housing 11, as illustrated in the upside-down disassembled perspective view of FIG. 7, comprises a lower plate 20 and an upper plate 21. A tunnel or outwardly bent loop 25 is formed on the exposed lower face of the lower plate 20. An elastic band 26 is passed through the tunnel for connecting the housing and the band together. Also, the lower plate 20 has a hinge projection 28 extending from a portion of its peripheral edge.

The magnifying glass 15 is formed with a conventional glass portion which is surrounded by a frame 30. The frame includes a hinge projection 31 that overlaps the hinge projection 28 of the lower plate.

Aligned pin openings 33 and 34 are formed in the housing hinge projection 28 and the magnifying glass frame hinge projection 31. A hinge pin 35 extends through the pin openings for connecting the two hinge projections together. Thus, the magnifying glass may be swung or pivoted between the plates into the space 36 located between the plates. The space or cavity is provided by forming a lip or flange 37 on the upper plate along the periphery of the plate. The lip or flange can be welded or soldered to the lower surface of the upper plate and, consequently, separates the two plates to form the cavity between the plates. An edge opening 38 is provided for opening the cavity between the plates to the exterior of the housing.

In operation, the magnifying glass is normally concealed within the space or cavity in the housing which is formed between the parallel plates. Money is held by the endless, loop, elastic band between the band and the housing lower plate. Alternatively, the band may be split so as to have a pair of opposite ends. Those ends may be connected to the lower plate of the housing, similar to the way a wristwatch band is connected to a wristwatch, by loops or lugs formed on the housing (not shown). It is preferred to form the band as a continuous band so that it maintains its elasticity or resiliency throughout its length for holding the money against the housing.

The user, when confronted with the need to magnify the print on an object, such as a "tab" or invoice in a restaurant or the like, manually pivots the magnifying glass out of its cavity in the housing so that the magnifying glass is now adjacent the housing. Hence, by manually holding the housing, with the money connected thereto, the magnifying glass can be temporarily used without attracting much attention to the user. When finished, the user may swivel the magnifying glass back into its concealed location within the housing. During that time, the money which is held by the band is undisturbed and together with the housing, forms a handle for holding the magnifying glass in its use position.

Figure 9:
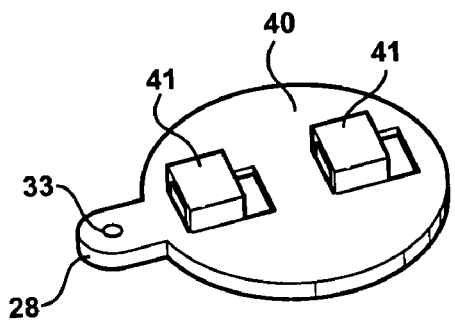
FIG. 9 is a bottom view of the lower plate of the housing illustrating a modification in which the loops through which the band is passed, are struck out of the lower surface of the lower plate.

FIG. 9 illustrates a modified form wherein the loop or tunnel thorough which the band is passed, may be formed by struck-out loops 41 on the lower plate 40. Thus, rather than forming a single relatively long tunnel by stamping a channel-like depression in the lower plate, two or more separate loops are formed by means of a conventional strike-out forming process. The tunnel and the separate loops may also be formed of separate pieces that are welded or otherwise secured to the housing plate.

Figure 10:
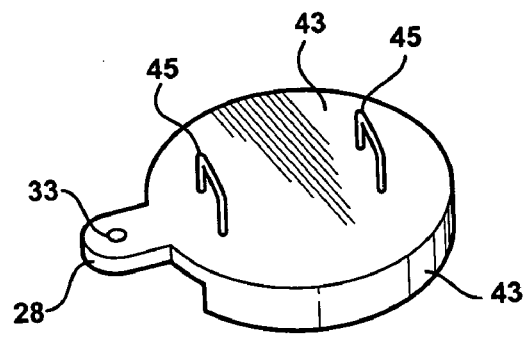
FIG. 10 illustrates a modification wherein wire-type loops are secured to the lower face of the lower plate for receiving and holding the elastic band.

Alternatively, FIG. 10 illustrates a modified arrangement wherein the lower plate 43 has the edge lip or flange 44 formed on its peripheral edge and wire or similar metal loops 45 are attached to the exposed surface of the lower plate, such as by soldering or welding.

Figure 11:
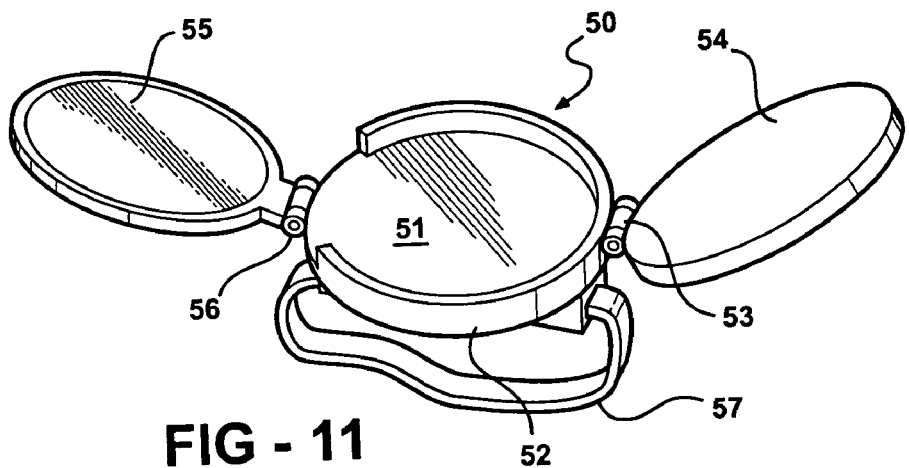
FIG. 11 illustrates a modification wherein the two plates that form the housing are arranged to pivot apart and the magnifying glass is arranged to pivot into a location between the plates. The view illustrates in perspective view the plates pivoted apart and the magnifying glass partially pivoted into its use position.

FIG. 11 illustrates a modified form in which the housing 50 has its lower plate 51 formed with an upright lip or flange 52 for providing the means for spacing the upper plate 54 from the lower plate. The two plates are hinged together by a conventional hinge 53. Thus, the lower plate and the upper plate may be separated by pivoting them apart along a generally horizontally arranged axis.

The magnifying glass 55 is connected to the lower plate by a hinge 56 so that it may be hingedly swung outwardly of the lower plate 51 for use when the plates are swung apart. For returning the magnifying glass to its concealed position, it is hingedly pivoted back against the lower plate and then covered by the upper plate. The elastic band 57 may be formed in the same manner as described above in connection with the embodiment of FIGS. 1–7.

This invention may be further developed within the scope of the following claims. Having fully described at least one operative embodiment of this invention, I now claim.

What is claimed is:

1. A money clip comprising:
    a substantially flat housing having an upper wall and a lower wall that are substantially parallel to each other and are spaced apart to form a flat cavity between the walls;
    an opening between the walls for communicating the cavity outwardly of the housing;
    a magnifying glass normally positioned within the housing, in the cavity between the walls in generally parallel arrangement with the walls;
    a hinge pivotally connecting the magnifying glass to the housing so that the magnifying glass may be manually pivoted about the hinge parallel to planes of the walls outwardly of the housing through the opening for extending away from the housing while connected thereto;
    a flexible, elastic band secured with the housing and forming a resilient loop of a size for encircling and resiliently gripping a wad of folded paper money bills, said paper money bills being gripped by the loop forcing the paper money bills against the housing lower wall and the loop;
    whereby the wad of paper money may be immovably held beneath and against the housing while the magnifying glass is manually pivoted outwardly of, and extended closely adjacent, the housing so that the user may manually hold the housing while looking through the magnifying glass, without affecting the position of the money which is held by the clip during the use of the magnifying glass, and the magnifying glass may, upon completion of its use, be pivoted back into the cavity, for storage therein, when not in use, so that the position of the wad of money that is gripped within the loop is not affected when the magnifying glass is stored.

2. A money clip as defined in claim 1, and including a lip formed on the periphery of a portion of one of the plates for extending to and being connected to the opposite plate portions for thereby enclosing a portion of the flat cavity between the plates, leaving said opening for receiving and concealing the magnifying glass when pivoted into the cavity.

3. A money clip comprising:
    a substantially flat housing having an upper wall and a lower wall with a space between the walls to form a cavity;
    an opening between the walls for communicating the cavity outwardly of the housing;

a magnifying glass normally positioned within the housing, in the cavity between the walls in generally parallel arrangement to the walls;

a hinge pivotally connecting the magnifying glass to the housing so that the magnifying glass may be manually pivoted about the hinge outwardly of the housing through the opening for extending away from the housing while connected thereto;

a flexible band secured to the lower wall of the housing for forming a loop of a size for encircling and holding paper money, said paper money being forced by the band against the housing lower wall;

a lip formed on the periphery of a portion of one of the plates for extending to and being connected to the opposite plate portions for thereby forming a generally flat cavity between the plates for receiving and concealing the magnifying glass when pivoted into the cavity;

whereby the paper money may be held within the loop between the band and housing while the magnifying glass may be manually extended from the housing when desired for use of the magnifying glass, without affecting the money which is held by the clip during the use of the magnifying glass, and the magnifying glass may, upon completion of its use, be pivoted back into the cavity, for storage therein, when not in use; and including a hinge projection formed on the lower plate and a corresponding hinge projection formed on the magnifying glass, with the hinge projections overlapping and being inter-connected by a pivot pin for pivoting the magnifying glass into and out of the housing cavity.

4. A magnifying glass as defined in claim 3, and the lower plate having an exposed lower surface with a rigid loop formed on such surface through which the band is passed so that the band forms an endless loop adjacent to, and secured to, the housing; and with the band being formed of an elastic material for holding a wad of paper money upon the money clip.

5. A money clip comprising:

a housing formed of a pair of spaced-apart plates that are interconnected along their peripheral edges to form a substantially flat space between the plates, with an opening communicating the space with the exterior of the housing formed by such plates;

a magnifying glass pivotally connected to at least one of the plates forming the housing for swinging into and out of the space so that the magnifying glass is normally concealed between the plates of the housing and may be manually swung outwardly of the housing to a position adjacent the housing for magnifying use;

an elastic band connected to the housing plate for holding a wad of money upon the housing; and including loops formed on the surface of at least one of the plates through which the elastic band is passed for connecting the band to the housing for resiliently holding a wad of paper money upon the housing;

whereby the user of the money clip may normally hold a folded wad of paper money upon the clip, with the magnifying glass concealed within the housing and, when desired, may extend the magnifying glass outwardly of the housing, while still keeping the money connected to the money clip while using the magnifying glass for magnifying purposes.

6. A money clip as defined in claim 5, and including the plates being pivotally connected by a hinge so that the plates may be swung apart relative to each other and alternatively may be swung towards each other to provide the space between the plates within the housing;

said magnifying glass being pivotally connected to one of the plates so that it may be pivoted against that one plate, for positioning the magnifying glass in the space formed when the two plates are pivoted into approximate parallel relationship to form the housing.

* * * * *